United States Patent
Austin et al.

(10) Patent No.: US 6,828,393 B1
(45) Date of Patent: Dec. 7, 2004

(54) RATE MATCHED COPOLYMERIZATION

(75) Inventors: Anne-Marie B. Austin, Signal Mountain, TN (US); Solomon Jacobson, Berkeley Heights, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 19 days.

(21) Appl. No.: 10/608,317

(22) Filed: Jun. 27, 2003

(51) Int. Cl.⁷ .................................................. C08F 2/00
(52) U.S. Cl. ............................ 526/87; 526/60; 526/78; 526/79
(58) Field of Search ............................ 526/60, 78, 79, 526/87

(56) References Cited

U.S. PATENT DOCUMENTS

| | | | |
|---|---|---|---|
| 5,124,393 A | * 6/1992 | Ingle et al. ................. | 524/458 |
| 5,360,867 A | 11/1994 | Sanchez ...................... | 525/70 |
| 5,504,166 A | * 4/1996 | Buchelli et al. ............... | 526/60 |
| 5,688,870 A | * 11/1997 | Wilkinson et al. .......... | 525/244 |
| 5,929,610 A | * 7/1999 | Friedlander et al. .......... | 322/37 |

* cited by examiner

Primary Examiner—Tatyana Zalukaeva
(74) Attorney, Agent, or Firm—Thomas F. Roland

(57) ABSTRACT

This invention relates to a method for controlling copolymer architecture by a two-part process. In the first step, a monomer analysis is obtained from a test polymerization having constant rate co-monomer addition. In the second step a copolymer is polymerized using a co-monomer feed rate that has been adjusted based on the monomer analysis to produce a copolymer with highly controlled polymer architecture. The method can predict feeds rates to produce any desired polymer architecture from a purely random polymer to a tapered polymer. The method works for terpolymers as well as copolymers.

5 Claims, 2 Drawing Sheets

RATE MATCHED COPOLYMERIZATION

FIELD OF THE INVENTION

This invention relates to a method for controlling copolymer architecture by a two part process. In the first step, a monomer analysis is obtained from a test polymerization having constant rate co-monomer addition. In the second step a copolymer is polymerized using a co-monomer feed rate that has been adjusted based on the monomer analysis to produce a copolymer with highly controlled polymer architecture.

BACKGROUND OF THE INVENTION

In the process of polymerizing two or more monomers to form a copolymer, it is common that the monomers may have different reaction rates. The mismatch in reaction rates can be partially corrected by using a slow-addition process in which the reactor initially contains the slower reacting monomer (M2), and the faster reacting monomer (M1) is added at a constant feed rate over some period of time. Because of the difference in reactivity of the monomers, expressed as reactivity ratios (r), the composition of the copolymer may be rich in one of the co-monomers (M1) in the initial stages of polymerization, and rich in the other co-monomer at the end of polymerization. This produces a tapered polymer architecture with a block rich in (M1), and then, as (M1) is depleted, the other monomer (M2) will, form a block rich in (M2) monomer.

Unfortunately this common polymerization method offers little control over the polymer architecture when monomers of significantly different reaction rates are co-polymerized.

Control of polymer architecture is an effective way to create several new and differentiated products. For example, a random copolymer (ideal copolymer) would be expected to have markedly different properties from a blocky copolymer of the same composition. Therefore, new products with improved performance can be developed by a deliberate change in the polymer architecture. Since it was found that many polymers have a more blocky structure, due to missmatched polymerization rates, it is desirable to develop a method to control polymer architecture.

Surprisingly it has been found, that copolymer architecture can be controlled by a two part process. A monomer analysis is obtained from a test polymerization having constant rate co-monomer addition, and second the co-monomer feed rate is adjusted based on the monomer analysis to produce a copolymer with highly controlled polymer architecture. This method facilitates new product development, and leads to new products with improved properties, designed for a specific application.

SUMMARY OF THE INVENTION

The present invention is directed at a method for controlling the polymer architecture of a copolymer comprising the steps of:
a) conducting a test polymerization of co-monomers comprising:
  1) charging the slower reacting monomer to a reactor, and beginning the polymerization;
  2) delay-feeding the faster reacting monomer(s) at a constant rate over a period of time:
  3) measuring periodically the residual monomer level of the slower reacting monomer;
  4) calculating the percent of slow monomer used up in each time period; and
  5) calculating a feed rate for the second monomer to obtain the desired polymer architecture; and b) conducting a polymerization of said co-monomers comprising:
  1) charging the slower reacting monomer to a reactor, and beginning the polymerization; and
delay-feeding the faster reacting monomer(s) at the variable rate determined in step a)4, to produce a copolymer having the desired polymer architecture.

DETAILED DESCRIPTION OF THE INVENTION

Figure 1:
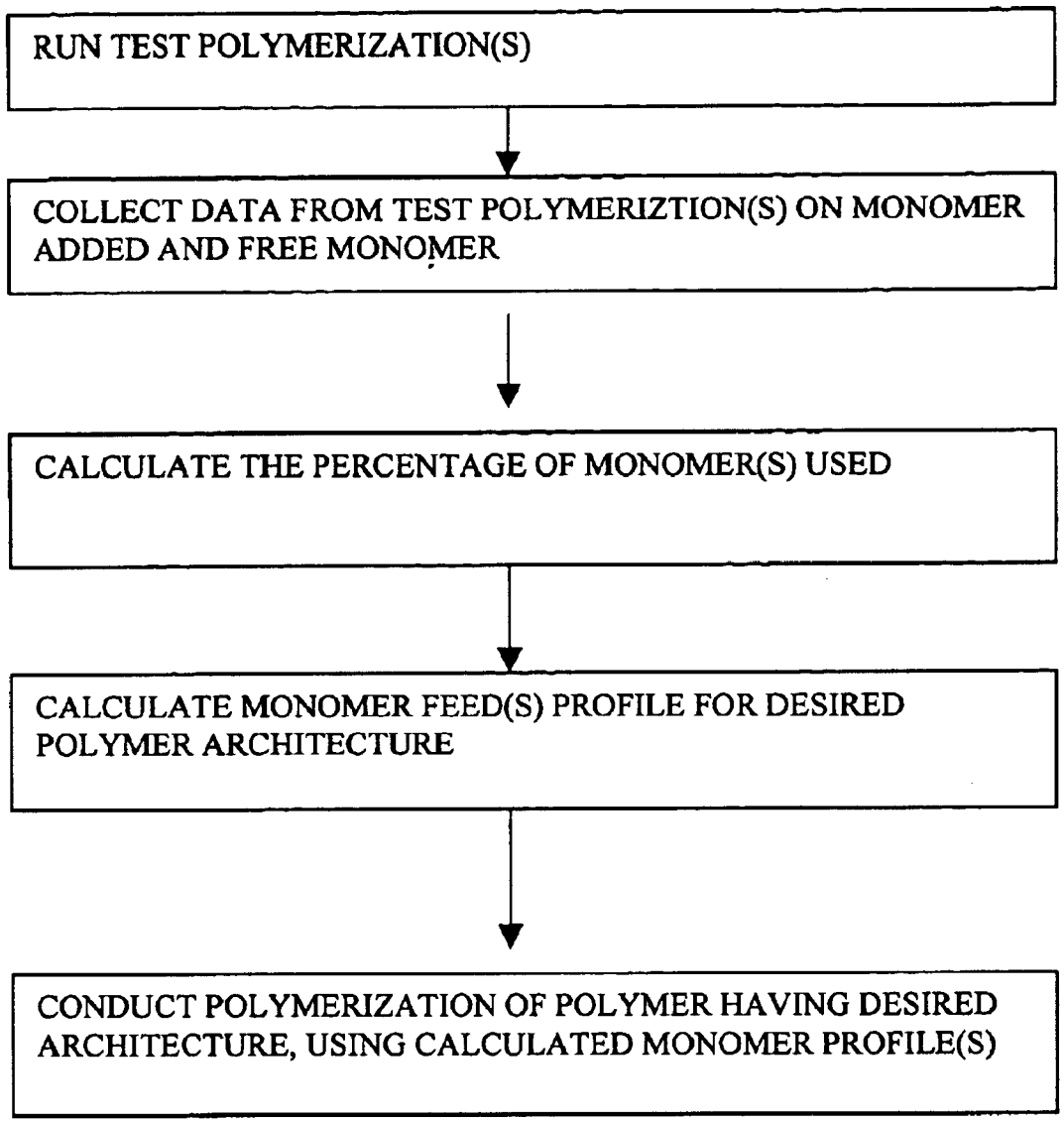
FIG. 1 is a schematic showing the flow of the method of the invention, which is described in detail in the Description.

This present invention relates to a method for controlling copolymer architecture by a two part process. In the first step, a monomer analysis is obtained from a test polymerization having constant rate comonomer addition. In the second step a copolymer is polymerized using a co-monomer feed rate that has been adjusted based on the monomer analysis to produce a copolymer with highly controlled polymer architecture.

The process works for solution, emulsion and other types of polymerizations; any polymers synthesized from two or more monomers; and any molar ratios of monomers. The process works with free-radical polymerizations and may be extended to include other types of polymerization.

The first step in the process involves a monomer analysis obtained by a test polymerization. In the test polymerization, all of the slower reacting co-monomer (M2) is charged to a reactor and the faster reacting monomer (M1) is delay fed at a constant rate. The length of the delay can be any amount, preferably from 2 to 10 hours, and most preferably from 3 to 6 hours. The amounts of the two monomers are chosen to match the mole ratio of monomers in the desired polymer. The concentration of the less reactive monomer (M2) in the reactor is measured over the course of the reaction. The concentration of free (slower) monomer (M2) is measured quantitatively. It represents the weight of unreacted monomer/total weight of the contents of the reactor. The concentration of the less reactive monomer goes down over the course of the reaction due to a) the monomer reacting (lowering the numerator), and also due to b) the increase in volume of the reactor due to the addition of the faster monomer. The amount of slower monomer used each time period is then calculated by subtracting the weight of monomer at the end of the time period from the weight of monomer at the beginning of the time period. The percent of monomer used in each time period is then calculated by dividing the amount of monomer used up each time period by the total weight of that monomer initially charged to the reactor, times 100.

In the second step, the more reactive monomer (M1) is fed at a variable rate calculated to produce a final polymer product with the desired polymer architecture.

This method is independent of the monomer mole ratios. It will be set at the ratio desired in the final product. Since the test polymerization will measure the percentage of monomer used in each time period, that percentage is then multiplied by the total amount of feed monomer to give the amount of the faster monomer (M1) to add in the final polymerization over each time period.

The other test conditions, such as the amount of solvent (if any), the type and amount of initiator, the temperature of reaction, and the mixing will remain as constants—the test polymerization will be run at the same conditions as the final polymerization, except for the varied feed rate of the faster reacting monomer (M1).

It is not necessary for the total polymerization time in the test polymerization to be the same as the second polymerization time, provided that the kinetics of the reaction will allow the reaction to occur in the desired time period. For example, in the test polymerization the fast monomer may be fed in over six hours, and the data collected can be used to develop a feed rate for the final polymerization lasting only two and a half hours—or any other time period as indicated by the results of the test polymerization.

When the co-polymerization is rate-matched over the entire reaction, a copolymer having nearly uniform composition over the length of the polymer chains will be obtained. A tapered block copolymer is obtained when there is a rate miss-match. Adjusting the miss-match between the test polymerization and the final polymerization monomer feed rate can control the degree of taper.

This two step process could be applied to a wide variety of different copolymers, and could be used to tune the polymer architecture between random and various tapered blocks.

The method of the invention is not limited to copolymers with two different monomers. Three or more monomers could be used. In the case of three monomers, two separate test polymerizations could be done to obtain data on the reaction of each of the monomers having faster reaction rates with the slower reacting monomer. The data would then be combined to obtain variable feed rates for each of the two faster monomers in the final reaction.

The polymerization is a free-radical reaction, and any free radical generator may be used. The initiator could be all initially charged to the reactor, or some could be in the initial charge, and the rest delay-fed to the reactor. It is important that the reaction not be run in an initiator-starved condition in the present method. In a similar manner as used for forming a terpolymer, it would be possible to run a test polymerization optimizing the initiator feed, and using that data in the final reaction.

By "fast" or "faster" and "slow" or "slower" as used herein in regard to monomer, is meant the relative relationship between the reactivity ratios of the two or more monomers being used to form the final polymer. Preferably the reactivity ratios of the monomers are dissimilar. The method could then be used to calculate variable feed rates for the faster monomer to produce a truly random polymer, or any other desired polymer architecture. The method is also applicable to monomers having nearly identical reaction ratios, when a non-random architecture, such as a tapered polymer, is desired. While it is assumed in the described examples below that the faster monomer reacts nearly instantly upon addition to the reactor, it is necessary only that the faster monomer is running in depletion.

The slow monomer ne ed not be all added in the initial charge. It could be delayed to the reactor in an amount equal to, or greater than, the percentage usage rate calculated from the test polymerization.

The following examples are presented to further illustrate and explain the present invention and should not be taken as limiting in any regard.

EXAMPLE 1

Figure 2:
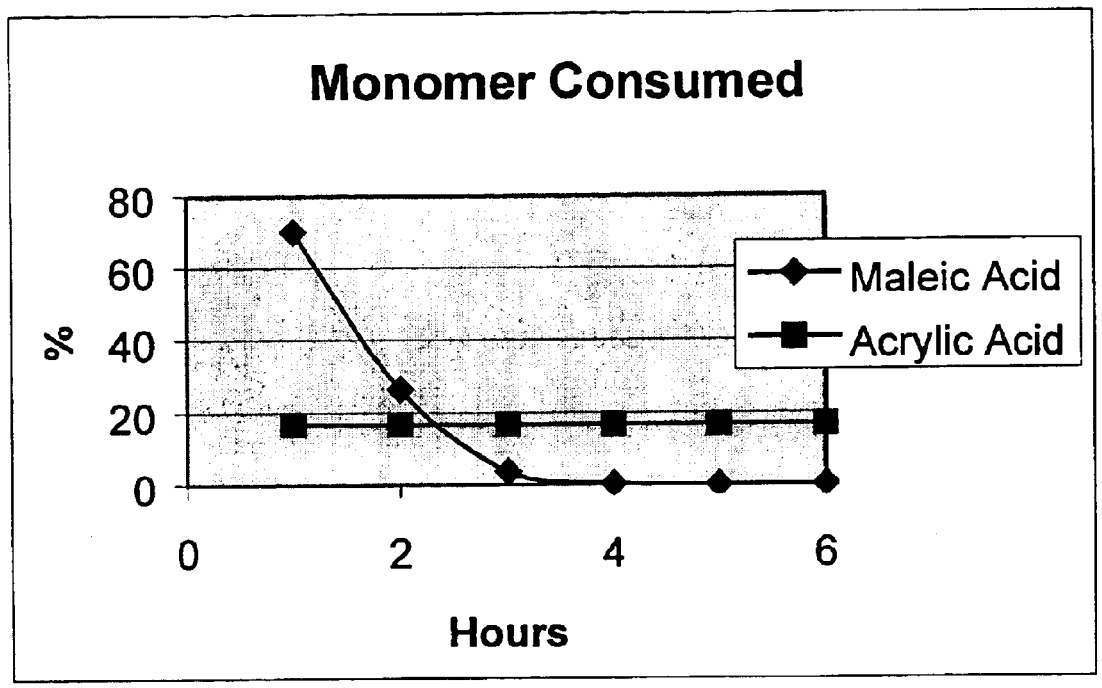
FIG. 2 is a plot showing the amount of monomer consumed over time in the test polymerization, from Example 1.

In a copolymer of maleic acid and acrylic acid, maleic acid reacts slower than acrylic acid. The goal of the reaction was to produce a random copolymer with a 50:50 maleic acid-acrylic acid composition. The first step was to complete a test polymerization. The reactor is initially charged with maleic acid which was 50.0 mole percent neutralized, and all of the initiator which consisted of sodium persulfate and a 10 percent hydrogen peroxide solution. An equal molar amount of acrylic acid, 51.9 percent neutralized, was slowly added over a six-our period. The polymerization was run at a temperature of between 94° C. and 98° C. for 6 hours. Agitation to provide a good vortex was used at a rate of about 40 rpm. Samples from the reaction were obtained every hour, and the amount of maleic acid determined via Liquid Chromatography. This is plotted in FIG. 2. This data was used to determine the percentage of the initial maleic acid that was consumed during the each hour of the reaction. The data are shown in Table 1.

TABLE 1

| | Test polymerization | | | | | |
|---|---|---|---|---|---|---|
| Time (hrs) | Total weight in reactor | Weight maleic acid in reactor | Wt % maleic acid in reactor | % maleic acid remaining | Moles of Maleic acid used in hour | Feed % acrylic acid for product |
| 0 | 329 | 118.11 | 35.9 | 100 | — | — |
| 1 | 370.7 | 35.58 | 9.60 | 30.13 | 34.94 | 69.87 |
| 2 | 412.6 | 4.54 | 1.10 | 3.84 | 3.14 | 26.29 |
| 3 | 454.0 | 0.40 | 0.09 | 0.34 | 1.75 | 3.50 |
| 4 | 495.7 | 0.06 | 0.01 | 0.05 | 0.145 | 0.29 |
| 5 | 537.4 | 0.012 | 0.00 | 0.01 | 0.019 | 0.039 |
| 6 | 579.1 | 0.009 | 0.00 | 0 | 0 | |

Figure 3:
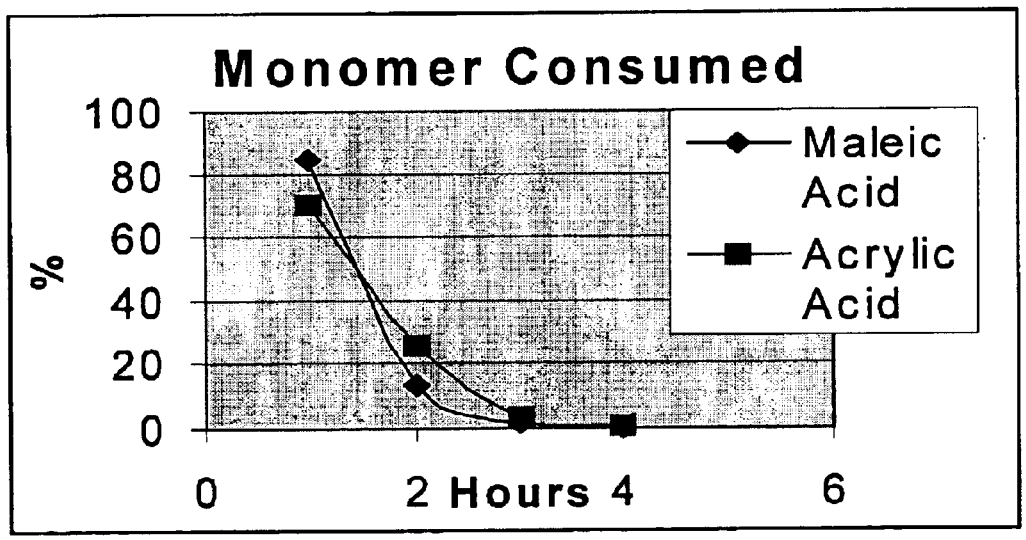
FIG. 3 is a plot showing the amount of monomer consumed over time in the final product polymerization of Example 1.

Since the acrylic acid reacts quickly, the amount of acrylic acid used is equal to the amount that was added. FIG. 3 plots these percentages as a function of time.

FIG. 3 shows that during the first hour of the reaction nearly 70 percent of the maleic acid was consumed, while only about 17 percent of the acrylic acid was polymerized. Thus, at the beginning of the polymerization the polymer composition is rich in maleic acid. Furthermore, this data indicates that most of the maleic acid has reacted by the end of the $3^{rd}$ hour. Thus, polymerization during hours 4–6 will involve mainly acrylic acid. This results in a highly non-uniform copolymer chain compositions, including, tapered block copolymers, where the polymer chains are initially rich in maleic acid, but finish the polymerization rich in acrylic acid.

Residual analysis of the test polymerization was then used to adjust the acrylic acid feed rate in the production polymerization, achieving the goal of a uniform polymer composition. Based on the amount of maleic acid consumed during the test polymerization, the production reaction time was shortened to 4 hours, and the acrylic acid feed rate was adjusted so that 70 percent of the acrylic acid was added during the first hour, 26 percent added during the second hour, 3.5 percent added during the third hour, and the final 0.5 percent was added during the fourth hour. Residual monomer analysis was completed for the production polymerization and the results are listed in Table 2 and plotted in FIG. 3.

TABLE 2

Product polymerization

| Time (hrs) | Total weight in reactor | Weight maleic acid in reactor | Wt % maleic acid in reactor | % maleic acid remaining | Moles of Maleic acid used in hour | Acrylic acid moles product |
|---|---|---|---|---|---|---|
| 0 | 318 | 119.58 | 35.9 | 100 | — | — |
| 1 | 510.57 | 35.58 | 9.60 | 15.37 | 42.31 | 35 |
| 2 | 582.08 | 4.54 | 1.10 | 1.95 | 6.71 | 13 |
| 3 | 593.08 | 0.40 | 0.09 | 0.18 | 0.89 | 2 |
| 4 | 593.08 | 0.03 | 0.01 | 0.03 | 0.075 | 0 |

FIG. 3 shows that the consumption of the two monomers is well matched over the entire reaction, resulting in a random copolymer with nearly uniform composition over the entire course of the reaction.

EXAMPLE 2

A test polymerization was run in the same manner as in Example 1, the difference being that the maleic anhydride was 25.0 mole percent neutralized and the acrylic acid was not neutralized at all, and the test polymerization was conducted over four hours. The results of the test polymerization are shown in Table 3. The % feed rate of the acrylic acid and vinyl acetate is calculated for producing a random polymer. The % feed rate of the acrylic acid is calculated for producing a random polymer.

TABLE 3

Test polymerization

| Time (hrs) | Total weight in reactor | Weight maleic acid in reactor | Wt % maleic acid in reactor | % maleic acid remaining | Moles of Maleic acid used in hour | Feed % acrylic acid for product |
|---|---|---|---|---|---|---|
| 0 | 339 | 133.90 | 39.5 | 100 | — | — |
| 1 | 406.2 | 98.71 | 24.3 | 73.71 | 13.14 | 26.30 |
| 2 | 473.4 | 15.01 | 3.17 | 11.21 | 31.25 | 62.51 |
| 3 | 540.8 | 2.54 | 0.47 | 1.90 | 4.65 | 9.31 |
| 4 | 607.8 | 1.06 | 0.17 | 0.79 | 0.55 | 1.11 |

Based on the test polymerization, variable feed rates were calculated to produce a completely random polymer architecture. The product polymerization was run, and residual monomer analysis was completed for the production polymerization and the results are listed in Table 4.

TABLE 4

Product polymerization

| Time (hrs) | Total weight in reactor | Weight maleic acid in reactor | Wt % maleic acid in reactor | % maleic acid remaining | Moles of Maleic acid used in hour | Acrylic acid moles added |
|---|---|---|---|---|---|---|
| 0 | 279 | 116.06 | 41.6 | 100 | — | — |
| 1 | 372.63 | 76.39 | 20.5 | 65.12 | 17.09 | 13.15 |
| 2 | 595.13 | 9.64 | 1.62 | 8.31 | 28.75 | 31.25 |
| 3 | 627.88 | 4.49 | 0.72 | 3.87 | 2.22 | 4.6 |
| 4 | 635 | 1.95 | 0.31 | 1.69 | 1.09 | 1 |

EXAMPLE 3

A test polymerization was run as in Example 1 using maleic acid (MA) (65 mote percent), acrylic acid (AA) (32 mole percent) and vinyl acetate (VA) (3 mole percent). The acrylic acid and vinyl acetate both fast reacting monomers, and were added to the reactor in a single feed. Data from the test polymerization are shown in Table 5. The % feed rate of the acrylic acid and vinyl acetate is calculated for producing a random polymer.

TABLE 5

Test polymerization

| Time (hrs) | Total weight in reactor | Weight maleic acid in reactor | Wt % maleic acid in reactor | % maleic acid remaining | Moles of Maleic acid used in hour | Feed % AA/VA for Random product |
|---|---|---|---|---|---|---|
| 0 | 711 | 357.63 | 50.3 | 100 | — | — |
| 1 | 788.5 | 309.09 | 39.2 | 86.43 | 8.82 | 13.57 |
| 2 | 866 | 245.94 | 28.4 | 68.76 | 11.48 | 17.66 |
| 3 | 943.5 | 157.56 | 16.7 | 44.06 | 16.06 | 24.71 |
| 4 | 1021 | 76.57 | 7.5 | 21.41 | 14.72 | 22.65 |
| 5 | 1098.5 | 35.15 | 3.2 | 9.83 | 7.53 | 11.58 |
| 6 | 1176 | 12.58 | 1.07 | 3.52 | 4.10 | 6.31 |

EXAMPLE 4

Using the same test polymerization as in Example 3 the feed rates for a tapered polymer are also predicted. The feed rates for the tapered polymer, and predicted chain segment compositions are listed in Table 6. The chain segment compositions (architecture) of the Test polymerization and the Random polymerization (using the rate-matched feed rates indicated in Table 5) are also listed for comparison.

TABLE 6

Tapered product polymerization

| Time (hrs) | Feed % AA/VA for tapered product | Moles AA used | Moles VA used | Predicted chain segment Compositions MA/AA/VA Test | Random | Tapered |
|---|---|---|---|---|---|---|
| 0 | — | — | — | — | — | — |
| 1 | 1.5 | 0.48 | 0.045 | 60/36/4 | 65/32/3 | 94.4/5.1/0.5 |
| 2 | 2.85 | 0.912 | 0.0855 | 66/31/3 | 65/32/3 | 92/7.3/0/7 |
| 3 | 5 | 1.6 | 0.15 | 73/24/3 | 65/32/3 | 90/9/1 |
| 4 | 10.5 | 3.36 | 0.315 | 72/24/3 | 65/32/3 | 80/18/2 |
| 5 | 21.5 | 6.88 | 0.645 | 56/40/4 | 65/32/3 | 50/46/4 |
| 6 | 58.65 | 18.77 | 1.759 | 41/54/5 | 65/32/3 | 17/76/7 |

What is claimed is:
1. A method for controlling the polymer architecture of a copolymer comprising the steps of:
  a) conducting a test polymerization of co-monomers comprising:
    1) charging the slower reacting monomer to a reactor, and beginning the polymerization;
    2) delay-feeding the faster reacting monomer(s) at a constant rate over a period of time;
    3) measuring periodically the residual monomer level of the slower reacting monomer;
    4) calculating the percent of slow monomer used up in each time period; and
    5) calculating a feed rate for the second monomer to obtain the desired polymer architecture; and
  b) conducting a polymerization of said co-monomers comprising:
    1) charging the slower reacting monomer to a reactor, and beginning the polymerization; and
    2) delay-feeding the faster reacting monomer(s) at the variable rate determined in step (a)(4), to produce a copolymer having the desired polymer architecture.

2. The method of claim 1 wherein the feed rate of the second monomer is rate-matched with the first polymer, producing a random copolymer having a nearly uniform composition.

3. The method of claim 1 wherein the feed rate of the second monomer is not rate-matched, producing a tapered polymer.

4. The method of claim 1 wherein three or more monomers are used to produce a terpolymer, wherein separate steps (a) 1–5 are conducted for monomer, and feed rates of each monomer are calculated to be used in step (b).

5. The method of claim 1 wherein the period of time in step a)2) is in the range of from 2 to 10 hours.

* * * * *